H. W. McINTYRE.
Extension-Table Slide.
No. 207,055.  Patented Aug. 13, 1878.
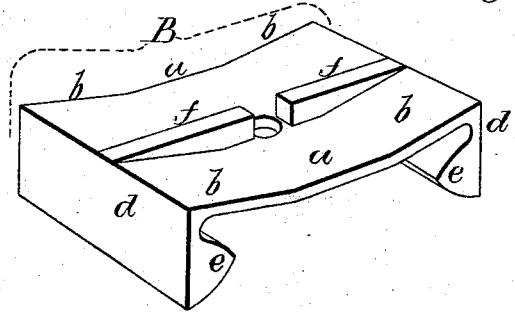
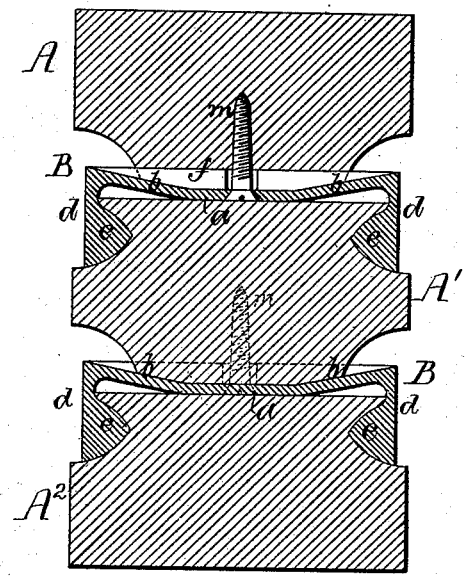
Witnesses,
Harry Smith
J. M. Deemer
Inventor,
Henry W. McIntyre
by his Attorneys
Howson and Son

UNITED STATES PATENT OFFICE.

HENRY W. McINTYRE, OF TOWANDA, PENNSYLVANIA.

IMPROVEMENT IN EXTENSION-TABLE SLIDES.

Specification forming part of Letters Patent No. 207,055, dated August 13, 1878; application filed June 19, 1877.

*To all whom it may concern:*

Be it known that I, HENRY W. MCINTYRE, of Towanda, Bradford county, Pennsylvania, have invented certain Improvements in Guides for the Slides of Extension-Tables; and I hereby declare that the following is a full, clear, and exact description of the same.

The object of my invention is to so construct a guide for extension-table slides as to insure strength and compactness, and to provide for the ready finishing of the guide by means of an emery-wheel or similar tool. This object I attain in the manner hereinafter described, reference being had to the accompanying drawings, in which—

Figure 1 is a perspective view of my improved extension-table-slide guide; and Fig. 2, a sectional view, showing a series of slides provided with my improved guides.

A, A¹, and A² represent slides such as are usually employed in extension-tables, and B B represent the plates by which the slides are connected to each other and guided in their movements. Each of these guide-plates consists of a casting having a flat central portion, $a$, inclined portions $b\ b$, and vertical end plates $d\ d$, the latter having on the inside beads $e\ e$, which are, in the present instance, made in the form of a Gothic arch, these beads being adapted to recesses of corresponding form in the edges of the slides. The precise form of bead and recess shown and described, however, is not essential, although it is preferred.

On the back of each casting is a transverse rib, $f$, the continuity of which is interrupted at the center to permit the introduction of the screw $m$, by which the plate B is secured to the slide. When the plate is applied to the slide the rib $f$ is adapted to a transverse groove cut in the under side of said slide. By inclining upward the portions $b\ b$ of the plate B proper facilities are afforded for the introduction of an emery-wheel or similar tool, by which the necessary smooth surface may be imparted to the beads $e$ and parts adjacent thereto, and by the use of the transverse rib $f$ the plate B is so strengthened transversely as to materially lessen the risk of fracture, while the longitudinal strain is removed from the screw $m$.

I claim as my invention—

1. The within-described guide for extension-table slides, said guide consisting of a plate, B, with flat portion $a$, inclined portions $b$, and vertical ends $d$, carrying beads $e$, as specified.

2. The plate B, having inclined portions $b$, and transverse rib $f$, all substantially as specified.

HENRY W. McINTYRE.

Witnesses:
E. F. GOFF,
JNO. W. MIX.